United States Patent [19]

Schwendeman

[11] Patent Number: 5,491,469
[45] Date of Patent: Feb. 13, 1996

[54] COMMUNICATION SYSTEM FOR TEMPORARILY DIRECTING RADIO RECEIVERS TO A SECOND RADIO FREQUENCY

[75] Inventor: Robert J. Schwendeman, Pompano Beach, Fla.

[73] Assignee: Motorola, Inc., Schaumburg, Ill.

[21] Appl. No.: 258,137

[22] Filed: Jun. 10, 1994

Related U.S. Application Data

[63] Continuation of Ser. No. 891,311, May 29, 1992, abandoned.

[51] Int. Cl.⁶ .................................................. H04Q 7/00
[52] U.S. Cl. .............................. 340/825.04; 340/825.03; 340/825.44
[58] Field of Search .................. 340/825.04, 825.03, 340/825.22, 825.44; 455/38.2, 71, 151.1, 151.2; 379/56, 57

[56] References Cited

U.S. PATENT DOCUMENTS

| | | | |
|---|---|---|---|
| 4,506,384 | 3/1985 | Lucas | 455/51.1 |
| 4,518,961 | 5/1985 | Davis et al. | 340/825.44 |
| 4,644,347 | 2/1987 | Lucas et al. | 340/825.04 |
| 4,713,808 | 12/1987 | Gaskill et al. | 370/94 |
| 4,734,694 | 3/1988 | Umetsu et al. | 340/825.44 |
| 4,831,373 | 5/1989 | Hess | 340/825.03 |
| 4,849,750 | 7/1989 | Andros et al. | 340/825.44 |
| 4,881,073 | 11/1989 | Andros et al. | 340/825.44 |
| 4,891,638 | 1/1990 | Davis | 340/825.44 |
| 4,894,649 | 1/1990 | Davis | 340/825.44 |
| 4,914,649 | 4/1990 | Schwendeman et al. | 340/825.44 |

OTHER PUBLICATIONS

Publication No. RES4/RSS(88) 30, published 1988, by the European Telecommunications Standards Institute (ETSI) entitled "A Possible Method of Radio Network Operation in the ERMES System".

Publication No. R35/RSS(88) 08, published 1988, by the Electronic Engineering Association, entitled "A Multi-Channel Paging System".

Primary Examiner—Donald J. Yusko
Assistant Examiner—Edwin C. Holloway, III
Attorney, Agent, or Firm—Keith A. Chanroo

[57] ABSTRACT

A radio communication system (1600) capable of communicating on at least two radio frequencies has a receiver (202, 206) which receives information addressed to at least one of a plurality of radio receivers (106) on a first radio frequency. A transmitter (104) transmits the information having a control signal therewith to at least one of the plurality of radio receivers (106) on the first radio frequency. A generator (102) generates the control signal for temporarily directing one or more of the plurality of radio receivers to a second radio frequency to receive address and message information. The radio receiver (106) has a receiver (804) which receives information on the first frequency, the information includes the control signal for temporarily directing the radio receiver (106) to the second radio frequency. A decoder (810) decodes the received information, and a frequency synthesizer 1802 directs the radio receiver (106) to receive information on the second radio frequency in response to the control signal. A controller (816) determines when to redirect the radio receiver (106) to return to the first radio frequency.

15 Claims, 10 Drawing Sheets

5,491,469

COMMUNICATION SYSTEM FOR TEMPORARILY DIRECTING RADIO RECEIVERS TO A SECOND RADIO FREQUENCY

This is a continuation of U.S. application Ser. No. 07/891,311, filed May 29, 1992, now abandoned.

FIELD OF THE INVENTION

This invention relates in general to communication systems and more specifically to a communication system capable of temporarily directing radio receivers to a second radio frequency.

BACKGROUND OF THE INVENTION

Communication systems utilizing selective call addressing typically employ receivers that have at least one unique selective call address associated therewith. These receivers are commonly referred to as selective call receivers or pagers. Operationally, when the selective call receiver receives and decodes its address, the selective call receiver alerts the user to the presence of incoming information and presents the information to the user. However, increasing traffic demands may cause the amount of message information for selective call receivers assigned to a radio frequency (RF) to exceed the maximum information capacity on that RF channel. Thus, the selective call receivers experience unreasonable delays because the messages queue extends beyond the queue length of the communication system on that R.F. frequency of operation.

Thus, what is needed is a communication system capable of temporarily directing selective call receivers to a second radio frequency to receive its address and message information.

SUMMARY OF THE INVENTION

A radio communication system capable of communicating on at least two radio frequencies has a receiver which receives information addressed to at least one of a plurality of radio receivers on a first radio frequency. A transmitter transmits the information having a control signal therewith to at least one of the plurality of radio receivers on the first radio frequency. A control signal is generated for temporarily directing one or more of the plurality of radio receivers to a second radio frequency to receive address and message information. The radio receiver has a receiver which receives information on the first frequency, the information includes the control signal for temporarily directing the radio receiver to the second radio frequency. A decoder decodes the received information for programming the radio receiver to receive information on the second radio frequency in response to the control signal. A controller, coupled to the decoder, determines when to reprogram the radio receiver to return to the first radio frequency.

In a radio receiver, a method for receiving information on a least two radio frequencies, comprising the steps of:

(a) receiving information on a first frequency wherein the information includes a control signal for temporarily directing said radio receiver to receive information on a second radio frequency;

(b) decoding the received information and the control signal;

(c) temporarily directing said radio receiver for receiving information on the second radio frequency;

(d) receiving information on the second frequency; and (e) returning said radio receiver to the first radio frequency.

DESCRIPTION OF A PREFERRED EMBODIMENT

Figures 1, 2:
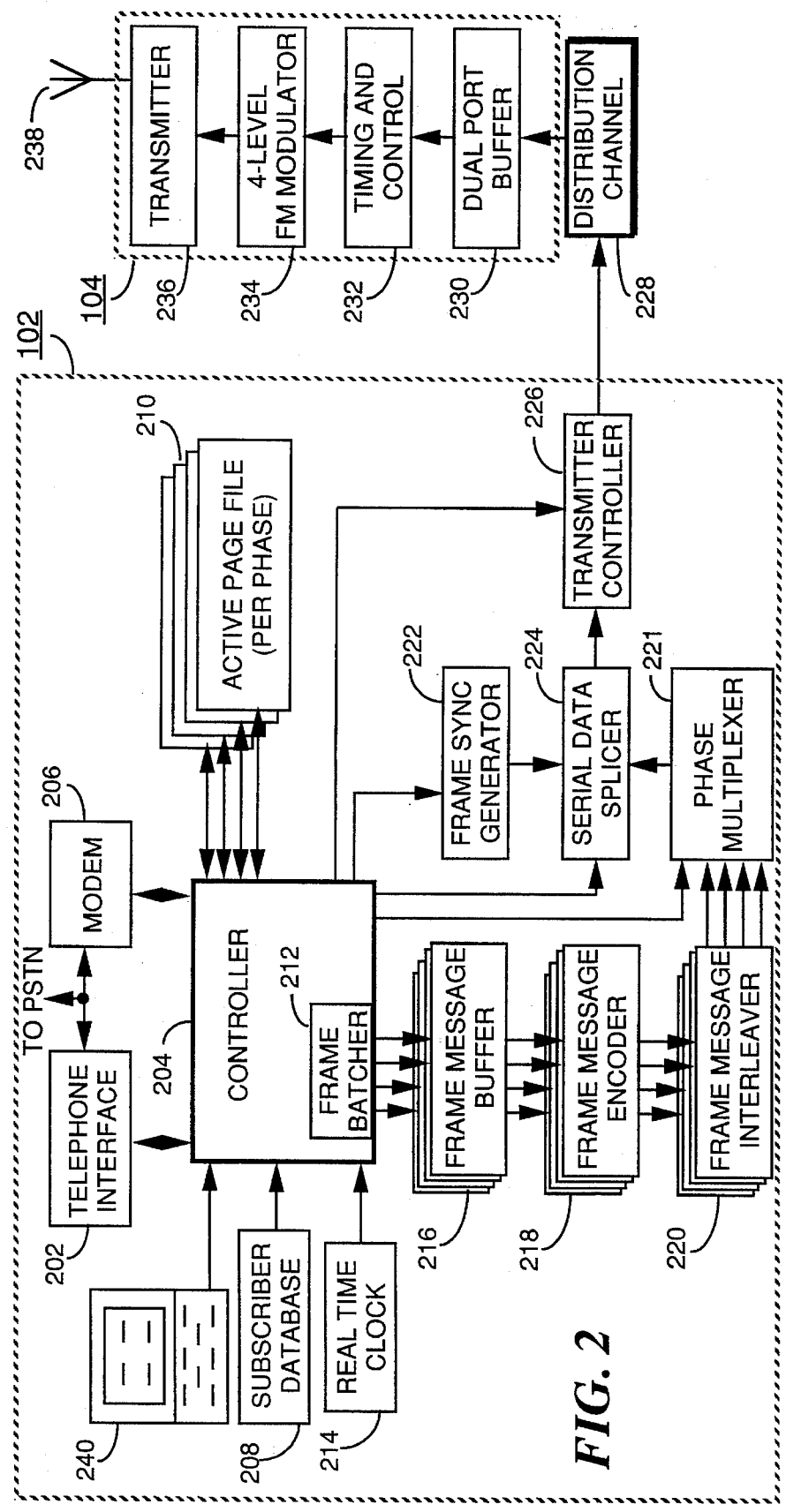
FIG. 1 is an electrical block diagram of a data transmission system in accordance with the present invention.
FIG. 2 is an electrical block diagram of a terminal for processing and transmitting message information in accordance with the preferred embodiment of the present invention.

FIG. 1 is an electrical block diagram of a data transmission system 100, such as a paging system, in accordance with the preferred embodiment of the present invention In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104, preferably in simulcast, transmit the message information to data communication receivers 106. Processing of the numeric and alphanumeric information by the paging terminal 102, and the protocol utilized for the transmission of the messages is described below.

FIG. 2 is an electrical block diagram of the paging terminal 102 utilized for processing and controlling the transmission of the message information in accordance with the preferred embodiment of the present invention. Short messages, such as tone-only and numeric messages which can be readily entered using a Touch-Tone telephone, are coupled to the paging terminal 102 through a telephone interface 202 in a manner well known in the art. Longer messages, such as alphanumeric messages which require the use of a data entry device, are coupled to the paging terminal 102 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber data base 208 to determine how the message being received is to be processed. The subscriber data base 208 includes, but is not limited to, such information as addresses assigned to the data communication receiver, message type associated with the address, and information related to the status of the data communication receiver, such as active or inactive for failure to pay the service charges. A data entry terminal 240 is provided which couples to the controller 204, and which is used for such purposes as entry, updating and deleting of information stored in the subscriber data base 208, for monitoring system performance, and for obtaining such information as service charge information.

The subscriber data base 208 also includes such information as to what transmission frame and to what transmission phase the data communication receiver is assigned, as will be described in further detail below. The received message is stored in an active page file 210 which stores the messages in queues according to the transmission phase assigned to the data communication receiver. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into flames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

Figure 3:
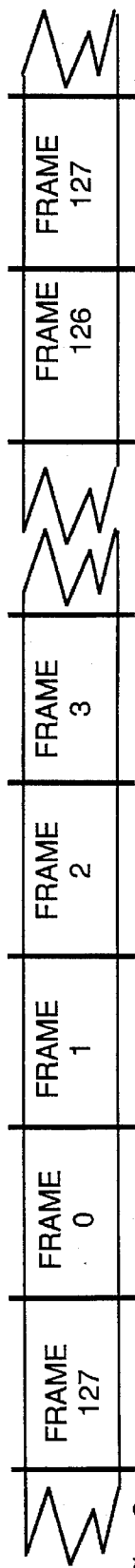
FIGS. 3–5 are timing diagrams illustrating the transmission format of the signaling protocol utilized in accordance with the preferred embodiment of the present invention.
Figure 4:
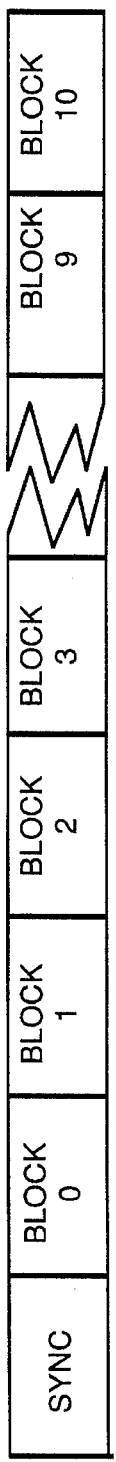
Figure 5:
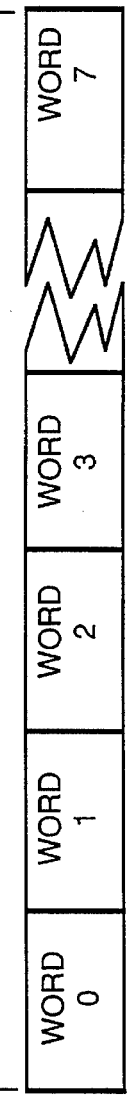

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers, such as pagers, assigned to one or more of 128 frames which are labeled frame 0 through frame 127. It then will be appreciated that the actual number of flames provided within the signaling protocol can be greater or less than described above. The greater the number of flames utilized, the greater the battery life that may be provided to the data communication receivers operating within the system. The fewer the number of flames utilized, the more often messages can be queued and delivered to the data communication receivers assigned to any particular frame, thereby reducing the latency, or time required to deliver messages.

As shown in FIG. 4, the flames comprise a synchronization code (sync) followed preferably by eleven blocks of message information which are labeled block 0 through block 10. As shown in FIG. 5, each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word could be utilized as well. Unlike the well known POCSAG signaling protocol which provides address and data code words that utilize the first code word bit to define the code word type, as either address or data, no such distinction is provided for the address and data code words in the signaling protocol utilized with the preferred embodiment of the present invention. Rather, address and data code words are defined by their position within the individual frames.

Figure 6:
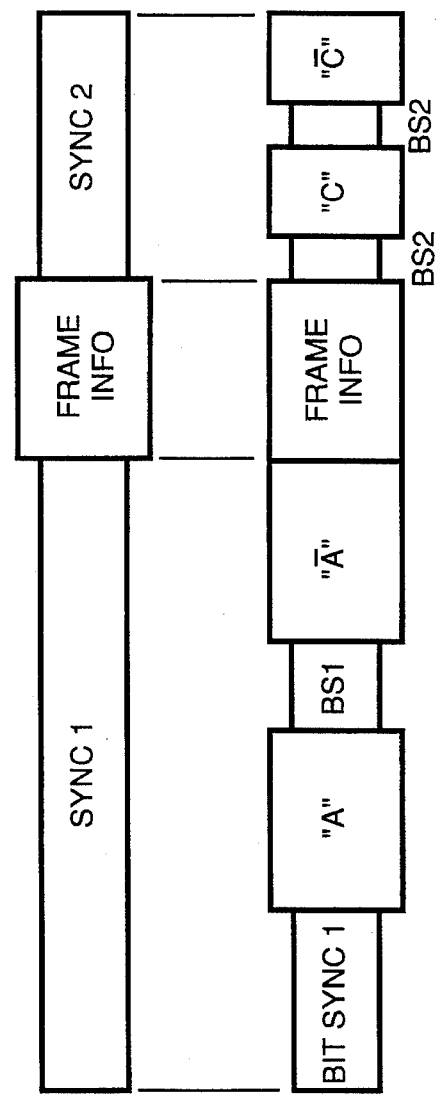
FIGS. 6 and 7 are timing diagrams illustrating the synchronization signals utilized in accordance with the preferred embodiment of the present invention.
Figure 7:
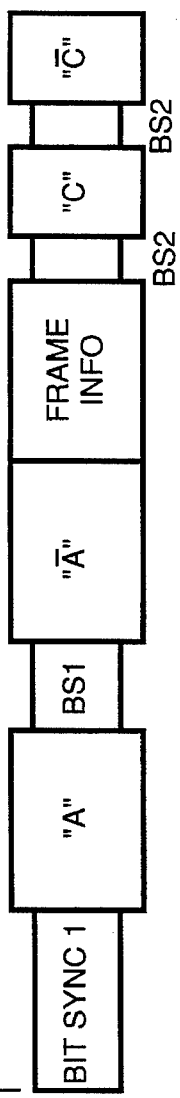

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information code word (frame info) and a second synchronization code (sync 2). As shown in FIG. 7, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
|---|---|
| 1600 bps | A1 and A1 bar |
| 3200 bps | A2 and A2 bar |
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization at the frame transmission data bit rate.

In summary, the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

Figure 8:
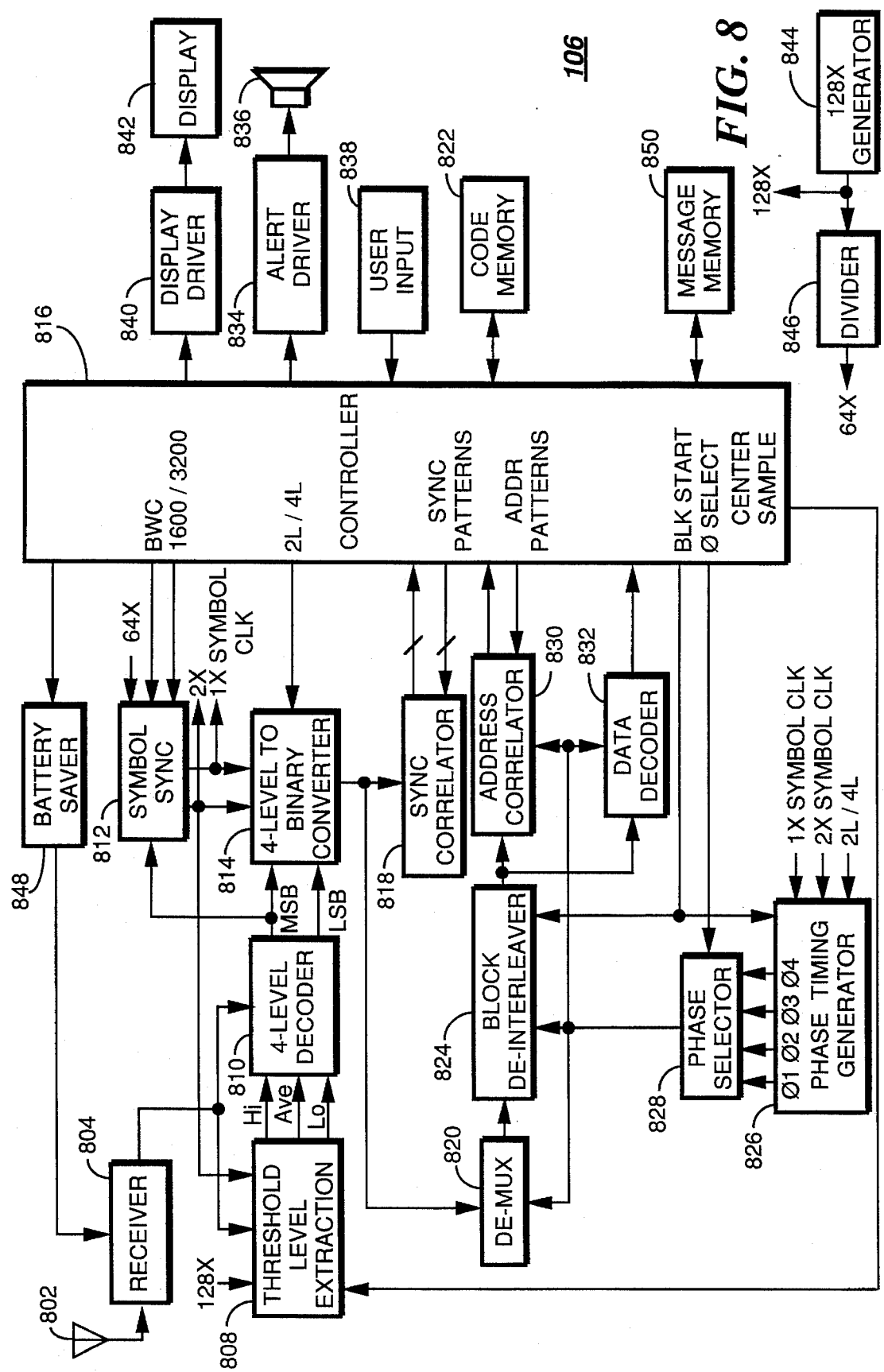
FIG. 8 is an electrical block diagram of a data communication receiver in accordance with the present invention.

FIG. 8 is an electrical block diagram of the data communication receiver 106 in accordance with the preferred embodiment of the present invention. The heart of the data communication receiver 106 is a controller 816, which is preferably implemented using an MC68HC05HC11 microcomputer, such as manufactured by Motorola, Inc. The microcomputer controller, hereinafter called the controller 816, receives and processes inputs from a number of peripheral circuits, as shown in FIG. 8, and controls the operation and interaction of the peripheral circuits are achieved by using software subroutines. The use of a microcomputer controller for processing and control functions is well known to one of ordinary skill in the art.

Figure 9:
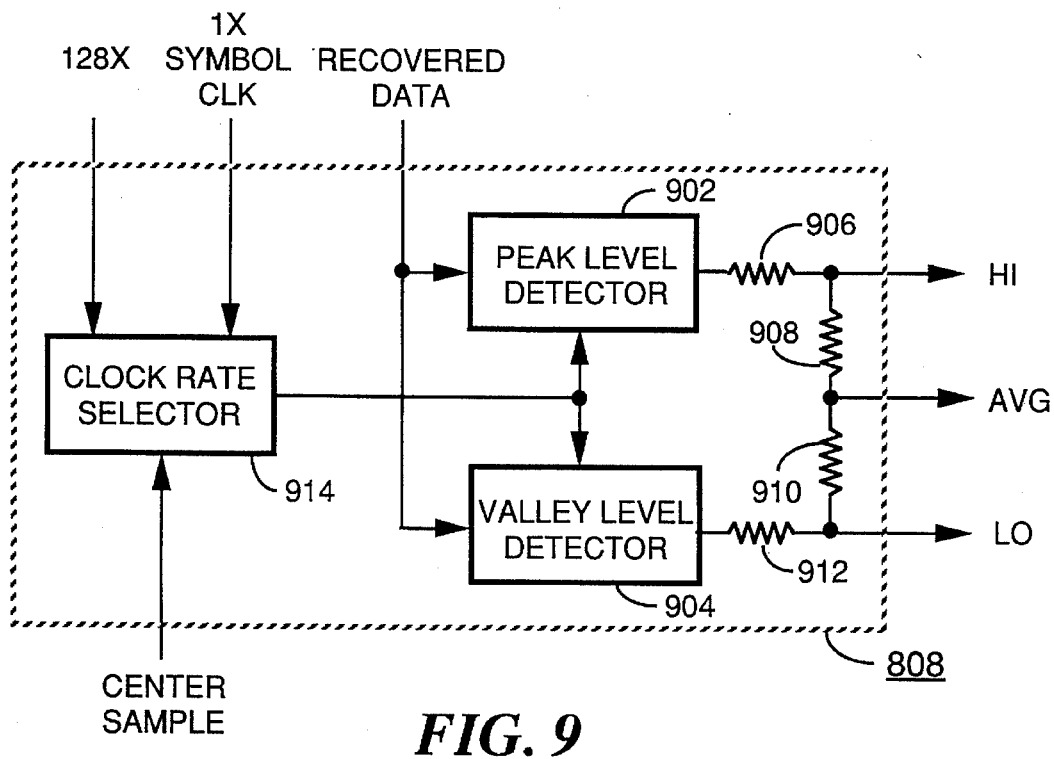
FIG. 9 is an electrical block diagram of a threshold level extraction circuit utilized in the data communication receiver of FIG. 8.

The data communication receiver 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a threshold level extraction circuit 808, and to an input of a 4-level decoder 810. The threshold level extraction circuit 808 is best understood by referring to FIG. 9, and as shown comprises two clocked level detector circuits 902, 904 which have as inputs the recovered data signal. Level detector 902 detects the peak signal amplitude value and provides a high peak threshold signal which is proportional to the detected peak signal amplitude value, while level detector 904 detects the valley signal amplitude value and provides a valley threshold signal which is proportional to the detected valley signal amplitude value of the recovered data signal. The level detector 902, 904 signal outputs are coupled to terminals of resistors 906, 912, respectively. The opposite resistor terminals 906, 912 provide the high threshold output signal (Hi), and the low threshold output signal (Lo), respectively. The opposite resistor terminals 906, 912 are also coupled to terminals of resistors 908, 910, respectively. The opposite resistor 908, 910 terminals are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 914 is preset through a control input (center sample) to select a 128× clock, i.e. a clock having a frequency equivalent to 128 times the slowest data bit rate, which as described above is 1600 bps. The 128× clock is generated by 128× clock generator 844, as shown in FIG. 8, which is preferably a crystal controlled oscillator operating at 204.8 kHz (kiloHertz). The output of the 128× clock generator 844 couples to an input of frequency divider 846 which divides the output frequency by two to generate a 64× clock at 102.4 kHz. Returning to FIG. 9, the 128× clock allows the level detectors 902, 904 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (Center Sample) to enable selection of a 1× symbol clock which is generated by symbol synchronizer 812 as shown in FIG. 8.

Figure 10:
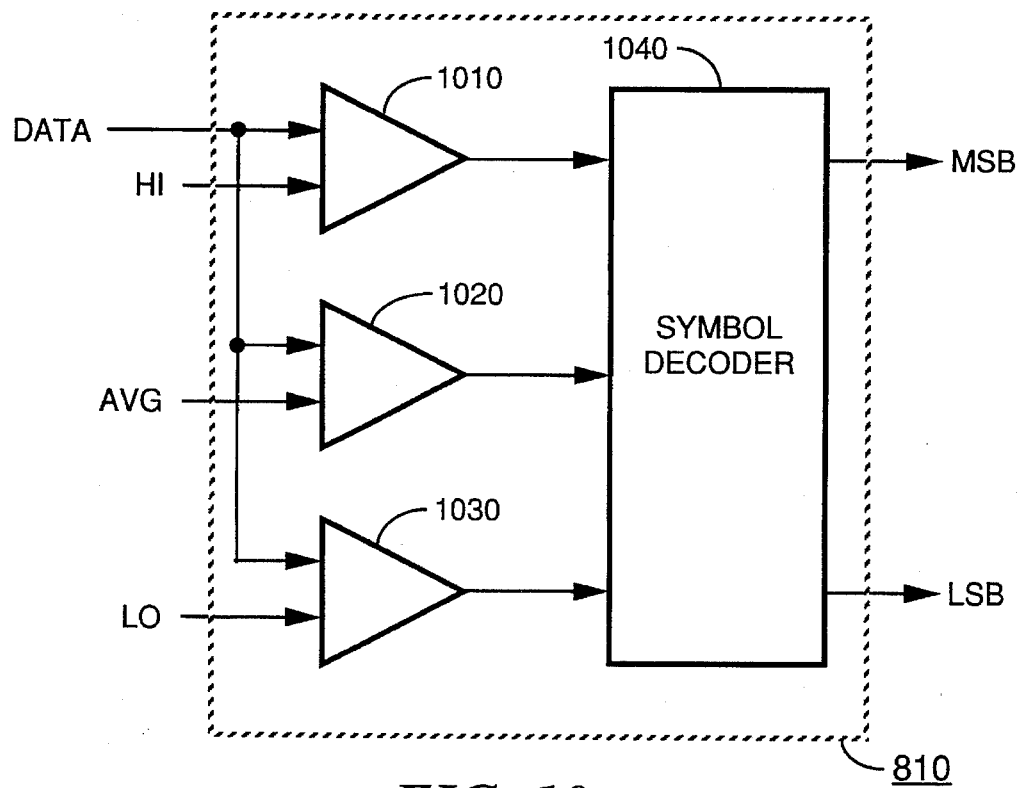
FIG. 10 is an electrical block diagram of a 4-level decoder utilized in the data communication receiver of FIG. 8.

Returning to FIG. 8, the 4-level decoder 810 operation is best understood by referring to FIG. 10. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| Threshold | | | Output | |
|---|---|---|---|---|
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} >$ | $RC_{in} >$ | 1 | 1 |
| $RC_{in} >$ | $RC_{in} >$ | $RC_{in} >$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 11:
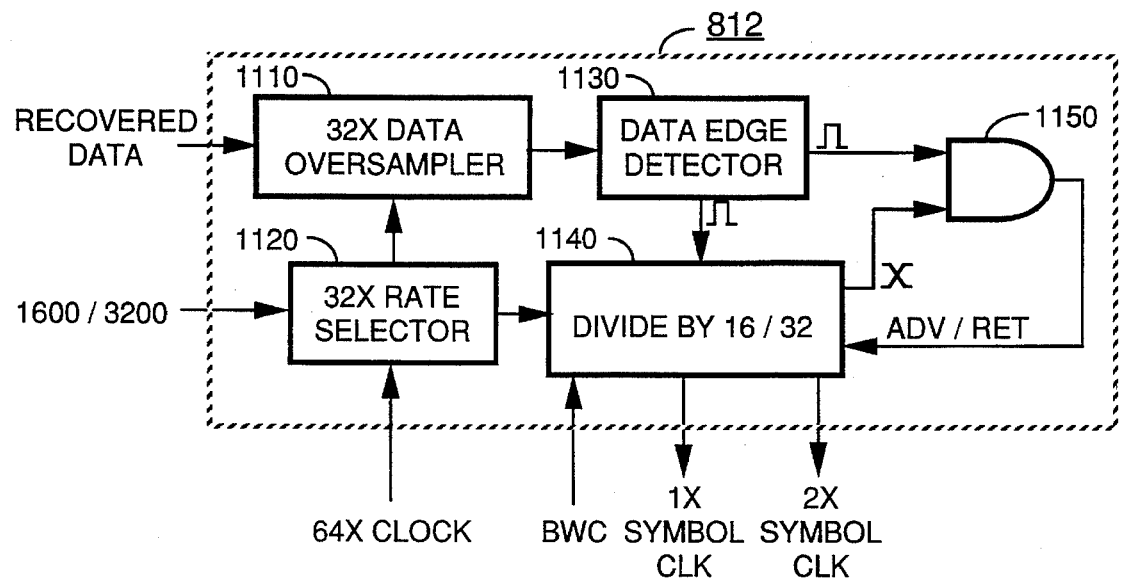
FIG. 11 is an electrical block diagram of a symbol synchronizer utilized in the data communication receiver of FIG. 8.

The operation of the symbol synchronizer 812 is best understood by referring to FIG. 11. The 64× clock at 102.4 kHz which is generated by frequency divider 846, is coupled to an input of a 32× rate selector 1120. The 32× rate selector 1120 is preferably a divider which provides selective division by 1 or 2 to generate a sample clock which is thirty-two times the symbol transmission rate. A control signal (1600/3200) is coupled to a second input of the 32× rate selector 1120 and is used to select the sample clock rate for symbol transmission rates of 1600 and 3200 symbols per second. The selected sample clock is coupled to an input of 32× data oversampler 1110 which samples the recovered data signal (MSB) at thirty-two samples per symbol. The symbol samples are coupled to an input of a data edge detector 1130 which generates an output pulse when a symbol edge is detected. The sample clock is also coupled to an input of a divide-by- 16/32 circuit 1140 which is utilized to generate 1× and 2× symbol clocks synchronized to the recovered data signal. The divided-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-16/32 circuit 1140, the output generated by AND gate 1150 causes the count of divide-by-16/32 circuit 1140 to be retarded by one count in response to the pulse which is coupled to the input of divide-by-16/32 circuit 1140 from the data edge detector 1130, thereby enabling the synchronization of the 1× and 2× symbol clocks with the recovered data signal. The symbol clock rates generated are best understood from the table below.

| Input Clock (Relative) | Control Input (SPS) | Rate Selector Divide Ratio | Rate Selector Output | 2X Symbol Clock (BPS) | 1X Symbol Clock (BPS) |
|---|---|---|---|---|---|
| 64X | 1600 | by 2 | 32X | 3200 | 1600 |
| 64X | 3200 | by 1 | 64X | 6400 | 3200 |

As shown in the table above, the 1× and 2× symbol clocks are generated at 1600, 3200 and 6400 bits per second and are synchronized with the recovered data signal.

Figure 12:
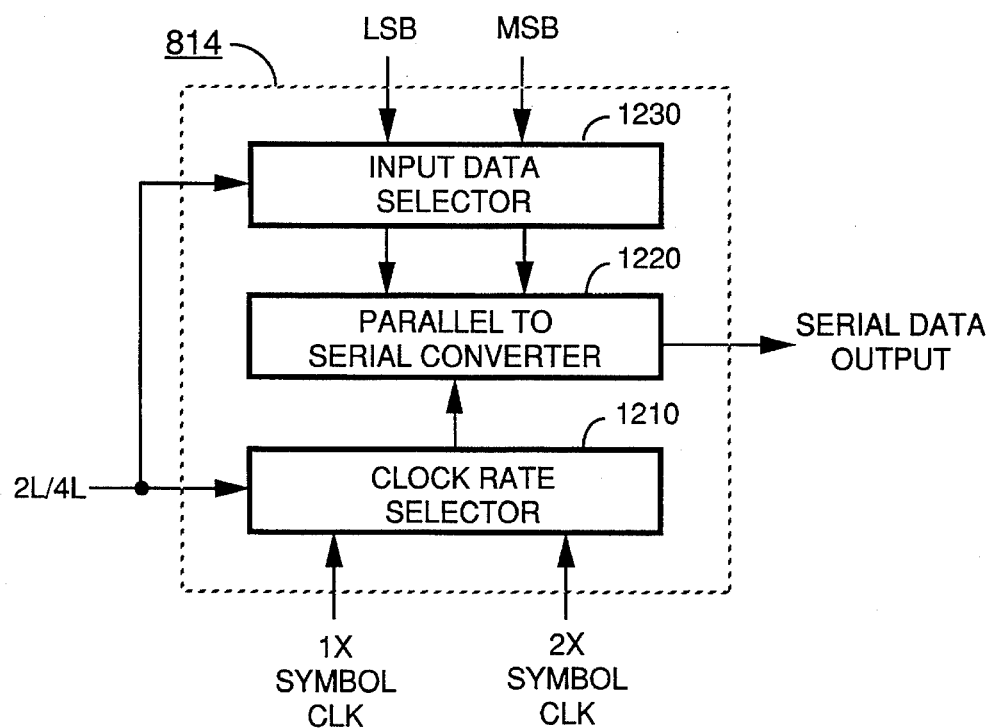
FIG. 12 is an electrical block diagram of a 4-level to binary converter utilized in the data communication receiver of FIG. 8.

The 4-level binary converter 814 is best understood by referring to FIG. 12. The 1× symbol clock is coupled to a first clock input of a clock rate selector 1210. A 2× symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data or 4-level FSK data. When the 2-level FSK data conversion (2L) is selected, only the MSB output is selected which is coupled to the input of a parallel to serial converter 1220. The 1× clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2× clock input is selected by clock rate selector 1210 which results in a serial two bit binary data stream to be generated at 2× the symbol rate, which is provided at the output of the parallel to serial converter 1220.

Returning to FIG. 8, the serial binary data stream generated by the 4-level to binary converter 814 is coupled to inputs of a synchronization word correlator 818 and a demultiplexer 820. The synchronization word correlator is best understood with reference to FIG. 13. Predetermined "A" word synchronization patterns are recovered by the controller 816 from a code memory 822 and are coupled to an "A" word correlator 1310. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame number, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 13:
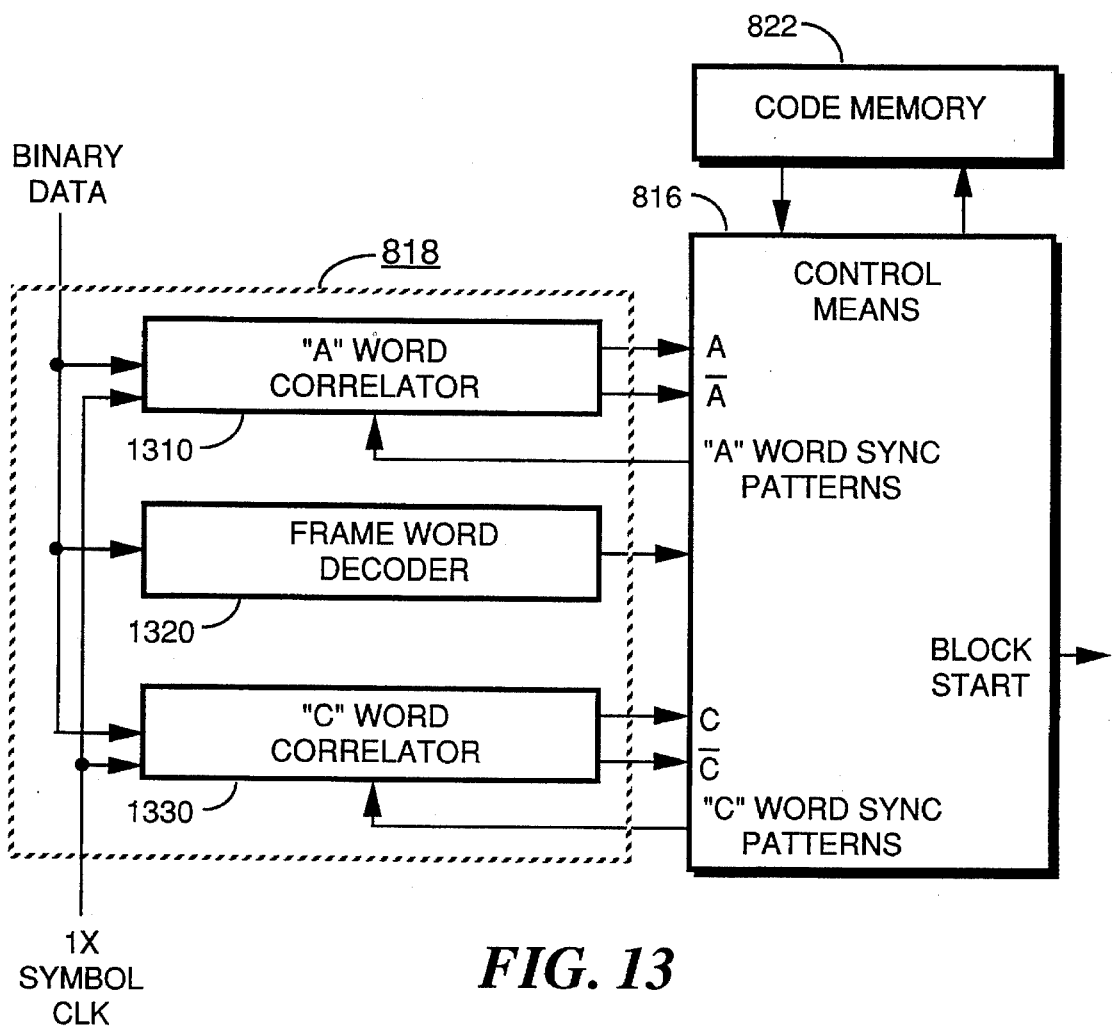
FIG. 13 is an electrical block diagram of a synchronization correlator utilized in the data communication receiver of FIG. 8.

Returning to the operation of the synchronization correlator shown in FIG. 13, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 14:
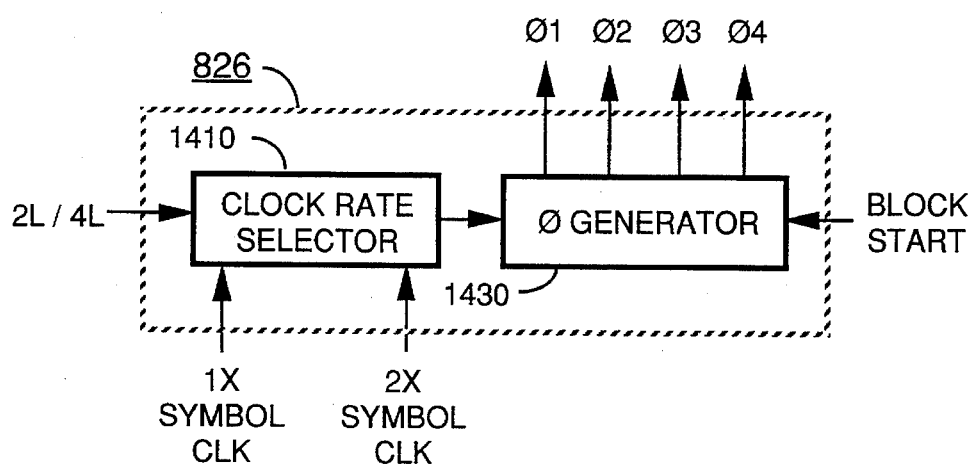
FIG. 14 is an electrical block diagram of a phase timing generator utilized in the data communication receiver of FIG. 8.

Returning to FIG. 8, the start of the actual data portion is established by the controller 816 generating a block start signal (Blk Start) which is coupled to inputs of a word de-interleaver 824 and a data recovery timing circuit 826. The data recovery timing circuit 826 is best understood by referring to FIG. 14. A control signal (2L/4L) is coupled to an input of clock rate selector 1410 which selects either 1× or 2× symbol clock inputs. The selected symbol clock is coupled to the input of a phase generator 1430 which is preferably a clocked ring counter which is clocked to generate four phase output signals (Ø1–Ø4). A block start signal (BLK START) is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 8, the clocked phase signal outputs are coupled to inputs of a phase selector 828. During operation, the controller 816 recovers from the code memory 822, the transmission phase number to which the data communication receiver is assigned. The phase number is transferred to the phase select output (Ø Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of address correlator 830. The controller 816 recovers the address patterns assigned to the data communication receiver, and couples the patterns to a second input of the address correlator. When any of the de-interleaved address code words matches any of the address patterns assigned to the data communication receiver within an acceptable margin of error, the message information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory, and provides the message information to a display driver 840 for presentation on a display 842, such as an LCD display.

Figure 15:
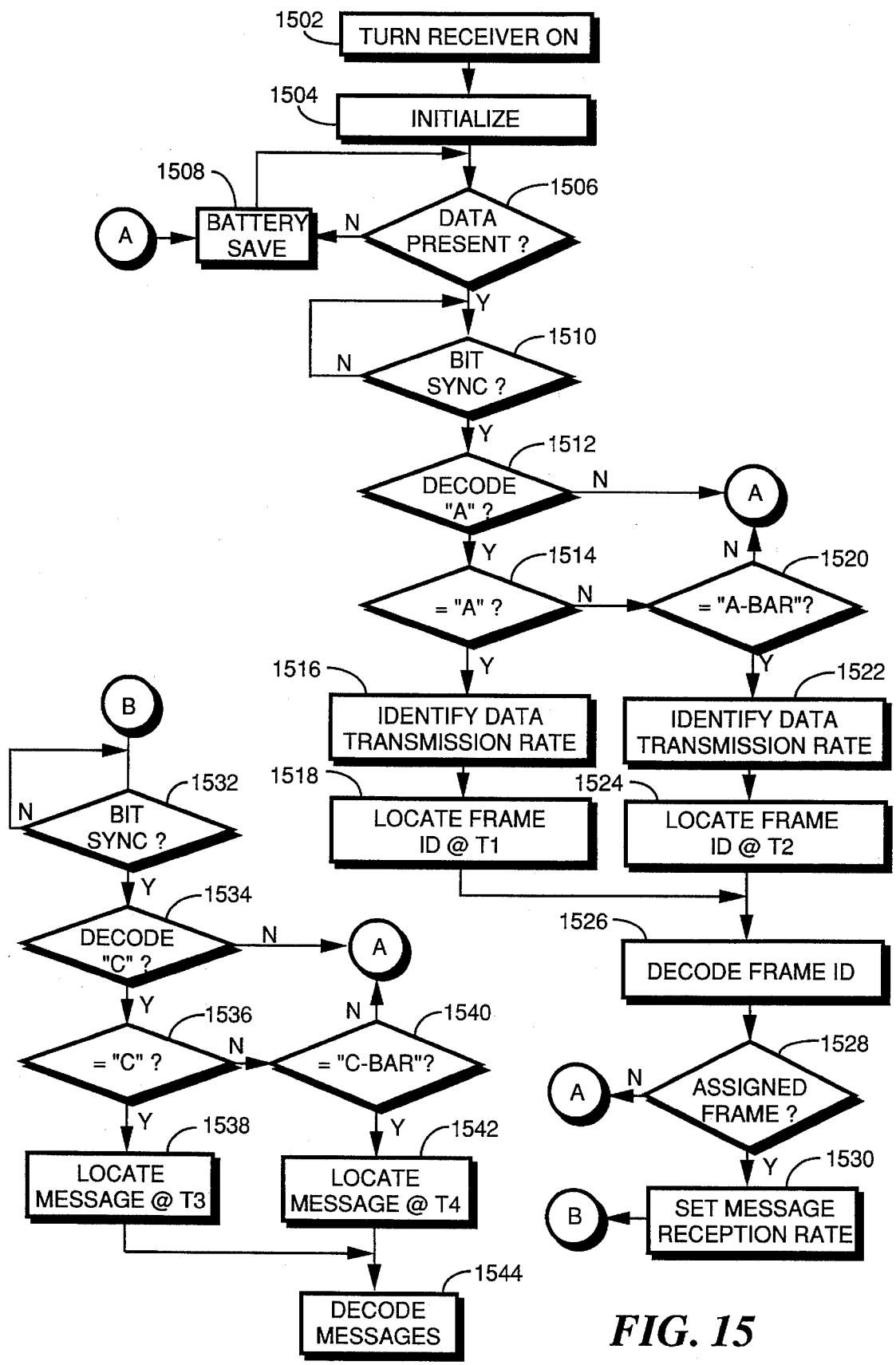
FIG. 15 is a flow diagram illustrating the synchronization correlation sequence in accordance with the preferred embodiment of the present invention.

FIG. 15 is a flow chart describing the operation of the data communication receiver in accordance with the preferred embodiment of the present invention. At step 1502, when the data communication receiver is turned on, the controller operation is initialized, at step 1504. Power is periodically applied to the receiver portion to enable receiving information present on the assigned RF channel. When data is not detected on the channel in a predetermined time period, battery saver operation is resumed, at step 1508. When data is detected on the channel, at step 1506, the synchronization word correlator begins searching for bit synchronization at step 1510. When bit synchronization is obtained, at step 1510, the "A" word correlation begins at step 1512. When the non-complemented "A" word is detected, at step 1514, the message transmission rate is identified as described above, at step 1516, and because frame synchronization is obtained, the time (T1) to the start of the frame identification code word is identified, at step 1518. When the non-complemented "A" word is not detected, at step 1514, indicating the non-complemented "A" word may have been corrupted by a burst error during transmission, a determination is made whether the complemented "A bar" is detected, at step 1520. When the "A bar" word is not detected at step 1512, indicating that the "A-bar" word may also have been corrupted by a burst error during transmission, battery saver operation is again resumed, at step 1508. When the "A-bar" word is detected, at step 1520, the message transmission rate is identified as described above, at step 1522, and because frame synchronization is obtained, the time (T2) to the start of the frame identification code word is identified, at step 1524. At the appropriate time, decoding of the frame identification word occurs, at step 1526. When the frame ID detected is not one assigned to the data communication receiver, at step 1528, battery saving is resumed, at step 1508, and remains so until the next assigned frame is to be received. When the decoded frame ID corresponds to an assigned frame ID, at step 1528, the message reception rate is set, at step 1530. An attempt to bit synchronize at the message transmission rate is next made at step 1532. When bit synchronization is obtained, at step 1533, the "C" word correlation begins at step 1534. When the non-complemented "C" word is detected, at step 1536, frame synchronization is obtained, and the time (T3) to the start of the message information is identified, at step 1538.

When the non-complemented "C" word is not detected, at step 1536, indicating the non-complemented "C" word may have been corrupted by a burst error during transmission, a determination is made whether the complement "C bar" is detected, at step 1540. When the "C bar" word is not detected at step 1540, indicating that the "C-bar" word may also have been corrupted by a burst error during transmission, battery saver operation is again resumed, at step 1508. When the "C-bar" word is detected, at step 1540, frame synchronization is obtained, and the time (T4) to the start of the message information is identified, at step 1542. At the appropriate time, message decoding can begin at step 1544.

In summary, by providing multiple synchronization code words which are spaced in time, the reliability of synchronizing with synchronization information that is subject to burst error corruption is greatly enhanced. The use of a predetermined synchronization code word as the first synchronization code word, and a second predetermined synchronization code word which is the complement of the first predetermined synchronization code word, allow accurate frame synchronization on either the first or the second predetermined synchronization code word. By encoding the synchronization code words, additional information, such as the transmission data rate, can be provided, thereby enabling the transmission of message information at several data bit rates. By using a second coded synchronization word pair, "fine" frame synchronization at the actual message transmission rate can be achieved, and as above, due to spacing in time of the synchronization code words, the reliability of synchronizing at a different data bit rate with synchronization information which is subject to burst error corruption is greatly enhanced, thereby improving the reliability of the data communication receiver to receive and present messages to the receiver user.

Figure 16:
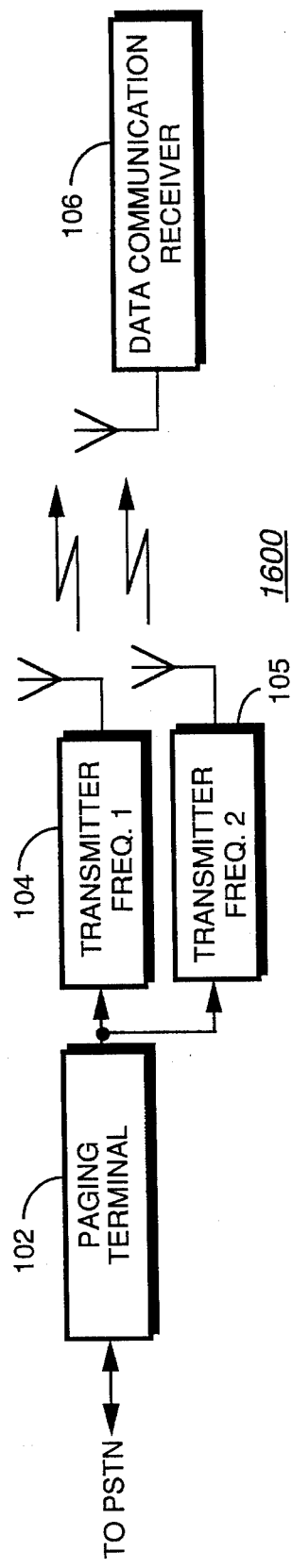
FIG. 16 is an electrical block diagram of a data transmission system for transmitting information on first and second frequencies in accordance with the preferred embodiment of the present invention.

FIG. 16 is an electrical block diagram of a data transmission system for transmitting information on first and second frequencies in accordance with the preferred embodiment of the present invention. FIG. 16 is similar to the embodiment of the data transmission system shown in FIG. 1 but for a first and second transmitters 104, 105 coupled to the paging terminal 102. The first transmitter 104 transmits information on preferably the first radio frequency, and the second transmitter 105 transmits information on a second radio frequency. The paging terminal 102 determines when to transmit the information on the second radio frequency thereby selecting transmitter 105 as will be discussed below.

Figure 17:
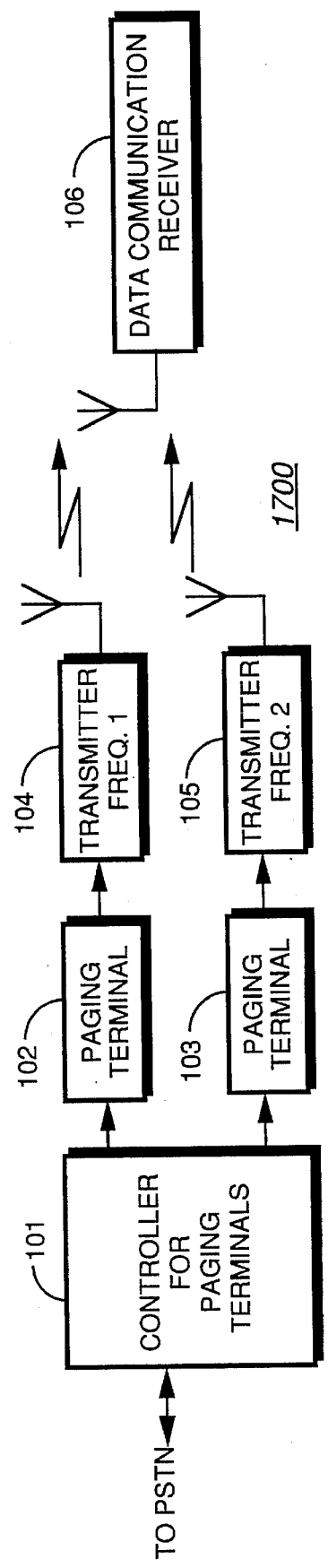
FIG. 17 is an electrical block diagram of a data transmission system for transmitting information on first and second frequencies in accordance with a second embodiment of the present invention.

FIG. 17 is an electrical block diagram of a data transmission system for transmitting information on first and second frequencies in accordance with a second embodiment of the present invention. The second embodiment shown in FIG. 17 is similar to the preferred embodiment shown in FIG. 16, but FIG. 17 shows a second paging terminal 103. Also, the first and second paging terminals 102, 103 are coupled to a controller 101 for controlling when to transmit information on the second radio frequency thereby selecting paging terminal 103 and transmitter 105. In both embodiments, the information is transmitted, by default, on the first radio frequency.

Figure 18:
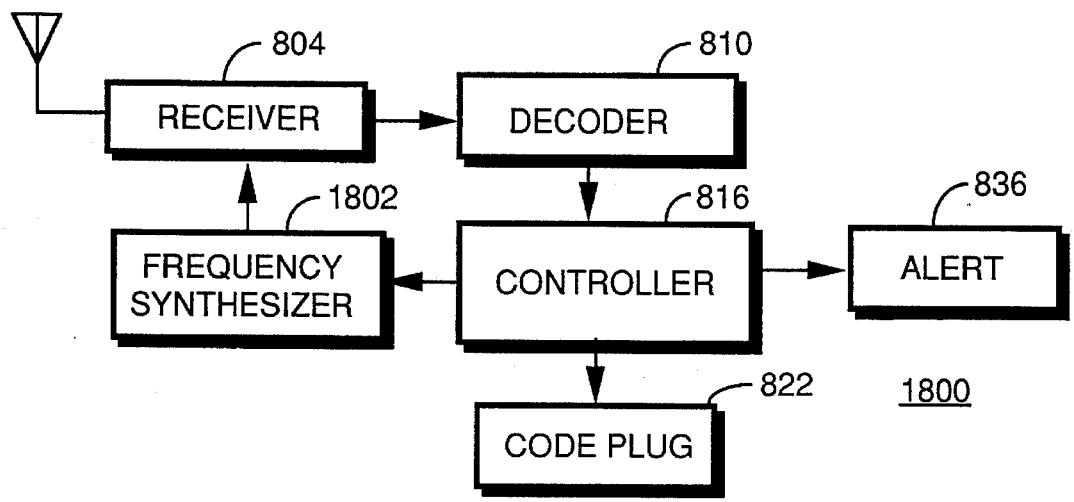
FIG. 18 is an electrical block diagram of a data communication receiver for receiving information on first and second frequencies in accordance with the preferred embodiment of the present invention.

FIG. 18 is an electrical block diagram of a data communication receiver for receiving information on first and second frequencies in accordance with the preferred embodiment of the present invention. FIG. 18 is similar to the embodiment of the data communication receiver shown in FIG. 8, but FIG. 18 exemplifies a frequency synthesizer 1802 which is coupled to the receiver 804 and the controller 816. The controller 816, in response to the decoder 810, determines when the frequency synthesizer 1802 is to be programmed to receive information on the first and second frequencies. The data communication receiver shows a code memory 822 for storing alternate frequency assignments specifically for a data communication receiver that operates in a plurality of cities. Depending on the particular city, the alternate frequencies are generally not the same because the frequencies are chosen depending upon the availability of frequencies in each city. Therefore, the code memory 822 is programmed with the alternate frequencies of the different cities. An example is shown below:

| Cities | Main frequency | Alternate 1 | Alternate 2 |
| --- | --- | --- | --- |
| Los Angeles | A | B | C |
| New York | A | D | F |
| Chicago | A | C | C |
| Podunk | A | A | A |

In the table, it is assumed that both Los Angeles and New York are experiencing high data traffic which result in different alternates from the main frequency, and Podunk has low data traffic, etc. It is well known to one of ordinary skill in the art that data communication receivers that operate in a plurality of cities access a common frequency (e.g., the main frequency or the first frequency). In this way, the data communication system need not know which city the receivers are in to receive data but only need to know the city to be able to receive data on the second (alternates) frequencies. Therefore, when the user is receiving data in any city, the data communication receiver receives a code which identifies the city and by accessing the code memory 822, the data communication receiver will know which frequencies are assigned as an alternate in that city. In this way, the data communication receiver, by receiving a city ID code, can redirect to at least a second frequency when the first frequency (main frequency) has a traffic level above the threshold value.

Instead of storing the table in the code memory 822, the alternate frequencies for each city can be transmitted to the data communication receivers when they are present in each city. This frequency assignment can be stored in a code memory that is programmable over-the-air. In this way, the data communication receivers can determine the alternate frequencies of different cities by reading the assignment transmitted over-the-air to the data communication receivers and thus will be able to redirect to the correct alternate second frequency.

Figure 19:
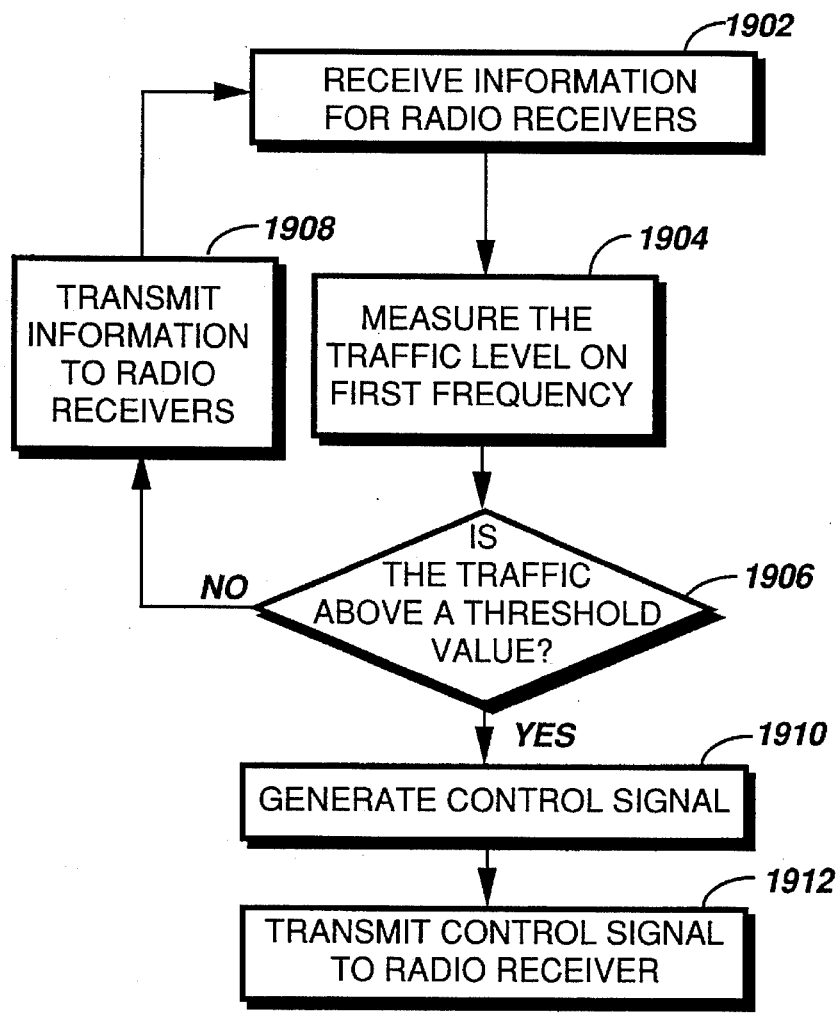
FIG. 19 is a flow diagram illustrating the sequence of the communication system for directing the radio receivers to a second radio frequency in accordance with the preferred embodiment of the invention.

FIG. 19 is a flow diagram illustrating the sequence of the communication system for directing the radio receivers to the second radio frequency in accordance with the preferred embodiment of the invention. Subsequent to the synchronization sequence, the communication receiver receives information addressed to the plurality of radio receivers, step 1902. The communication system, specifically the paging terminal, measures the level of traffic on the first radio frequency assigned to the communication system for transmitting information to the plurality of radio receivers, step 1904. The paging terminal then determines if the traffic intended to be transmitted on the first radio frequency will be above a threshold traffic level assigned to the first radio frequency, step 1906. Setting this threshold traffic value is well known to one of ordinary skill in the art. When the traffic is not above the threshold value, the received information is transmitted to at least one of the radio receiver on the first frequency, step 1908, in a manner well known to one of ordinary skill in the art, and then the paging terminal returns to receiving information, step 1902. However, when the traffic level is above the threshold value, a control signal is generated preferably by the paging terminal to direct the radio receiver to which the control signal is sent to interrogate a second frequency for its address and information, step 1910. The control signal is then transmitted to the radio receiver, step 1912, to receive information on the second frequency as will be discussed below.

Figure 20:
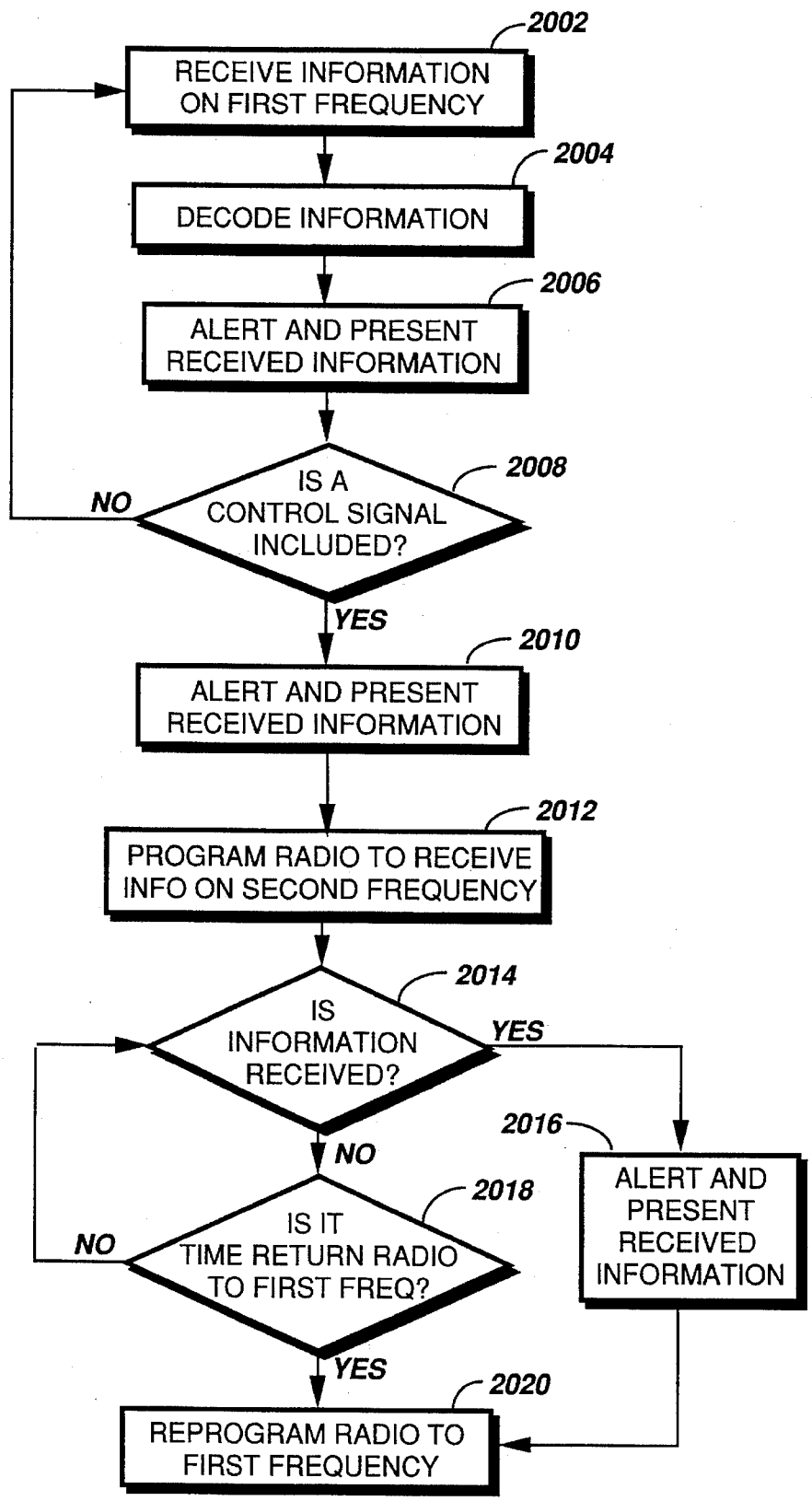
FIG. 20 is a flow diagram illustrating the sequence of the radio receiver for receiving information on a second radio frequency in accordance with the preferred embodiment of the present invention.

FIG. 20 is a flow diagram illustrating the sequence of the radio receiver for receiving information on first and second radio frequencies in accordance with the preferred embodiment of the invention. The radio receiver, addressed by the paging terminal to receive information, receives the transmitted information on the first radio frequency, step 2002. The information received by the radio receiver can include the control signal encoded in the information or an address by techniques known to one of ordinary skill in the art. In step 2004, the received information is decoded and in step 2006, a user is alerted and presented with the received information. Step 2008 determines if the control signal is included in the information. When none is included, the radio receiver returns to step 2002 to continue to wait to receive information. When the control signal is included in the information, the user is alerted and presented with information if any information was received on the first frequency, 2010. The receiver is then programmed or directed to receive or to interrogate the second radio frequency for information directed to that radio receiver, step 2012. After the radio has been programmed or redirected to the second radio frequency in response to the control signal, the radio receiver waits to receive information on the second radio frequency, step 2014. When information is received, the user is alerted and presented with the received information, step 2016, and then the receiver is reprogrammed to return or directed to return to receiving information on the first frequency, step 2020. If no information is received, the receiver determines in step 2018 when to reprogram the radio receiver to return to the first radio frequency. The determination of when to reprogram the radio receiver includes a timer which times out after a predetermined time period. In this way, the radio receiver is reprogrammed to return to the first radio frequency when the radio receiver has received information on the second radio frequency, or when the timer determines, upon the expiration of a predetermined length of time, that it is time to redirect or return the radio receiver to the first radio frequency. The radio receiver includes a frequency synthesizer that is programmed to switch the receiver between the at least two frequencies as is well known to one of ordinary skill in the art. The receiver is then reprogrammed to return to receiving information on the first frequency, step 2020.

The communication system, as described, receives information on a first frequency which is present to the user of, for example, a selective call receiver. However, upon the happening of a predetermined event, for example, when the traffic to be assigned on the first radio frequency exceeds a threshold value, as determined preferably by the paging terminal, a control signal is sent to the radio receivers that are to receive information to reprogram the radio receivers to receive information including its address on a second radio frequency to prevent overloading the first radio frequency. After the radio receivers have received the information on the second radio frequency, or on some other predetermined condition or event, the radio receiver is reprogrammed to return to the first radio frequency to continue normal operations. In this way, the communication system is capable of temporarily directing selective call receivers to a second radio frequency to receive its address and message information to prevent overloading the assigned first radio frequency.

I claim:

1. A radio communication system for communicating on at least two radio frequencies, the radio communication system, comprising:

receiving means for receiving information addressed to at least one of a plurality of radio receivers;

a first transmitting means for transmitting the information including a control signal therewith to at least one of the plurality of radio receivers on a first radio frequency;

a second transmitting means for transmitting information on a second radio frequency;

a paging terminal, coupled the receiving means, and the first and second transmitting means, determines when to transmit information on the second radio frequency by selecting the second transmitting means;

means for generating the control signal to be transmitted on the first radio frequency in response to the paging terminal selecting the second transmitting means for transmitting information to the at least one of the plurality of radio receivers; said at least one of the plurality of radio receivers, comprising:

receiving means for receiving information and the control signal on the first radio frequency;

decoder means for decoding the received information and the second radio frequency from the control signal being received on the first radio frequency;

means for programming said receiving means to receive information on the second radio frequency in response to the control signal being received on the first radio frequency;

controller means, coupled to said means for programming, for controlling when to reprogram said receiving means to return from the second radio frequency to the first radio frequency within a predetermined time to continue receiving information on the first radio frequency.

2. The communication system according to claim 1 wherein said controller means further comprises a timing means for determining when to return said receiving means from the second radio frequency to the first radio frequency.

3. The communication system according to claim 1 wherein the programming means programs a frequency synthesizer of said radio receiver to receive information on the first and second radio frequencies.

4. The communication system according to claim 1 wherein the controller means returns said receiving means from the second radio frequency to the first radio frequency following a reception of the information on the second radio frequency.

5. The communication system according to claim 1 wherein the at least one of a plurality of radio receivers further comprises a directing means that directs the receiving means to the second radio frequency when a traffic level on the first radio frequency exceeds a threshold value.

6. The communication system according to claim 1 wherein the information transmitted to the radio receiver including a frequency assignment designating the second frequency for redirecting the at least one of the plurality of radio receivers.

7. A radio communication system for communicating on at least two radio frequencies, the radio communication system, comprising:
- a receiver for receiving information addressed to at least one of a plurality of selective call receivers;
- a first transmitter for transmitting the information including a control signal therewith to at least one of the plurality of selective call receivers on a first radio frequency;
- a second transmitter for transmitting information on a second radio frequency;
- a paging terminal, coupled the receiver, and the first and second transmitters, determines when to transmit information on the second radio frequency by selecting the second transmitter;
- a microcomputer for generating the control signal to be transmitted on the first radio frequency in response to the paging terminal selecting the second transmitter for transmitting information to the at least one of the plurality of radio receivers; said at least one of the plurality of radio receivers, comprising:
  - a receiver for receiving information and the control signal on the first radio frequency;
  - a decoder for decoding the received information and the second radio frequency from the control signal being received on the first radio frequency;
  - a controller coupled to the decoder for controlling the programming of said at least one of the plurality of selective call receivers to receive information on the second radio frequency in response to the control signal;
  - said controller determines when to reprogram said at least one of the plurality of selective call receivers to return from the second radio frequency to the first radio frequency following a reception of information on the second radio frequency;
  - an alerting device for alerting a user of the received information; and
  - a display device for displaying the received information.

8. A radio receiver for receiving information on a least two radio frequencies, comprising:
- receiving means for receiving information and a control signal on a first radio frequency;
- decoder means for decoding the received information and a second radio frequency from the control signal being received on the first radio frequency;
- means for programming said receiving means to the second radio frequency for temporarily receiving information in response to the control signal;
- controller means, coupled to said programming means, for determining when to reprogram said receiving means to return from the second radio frequency to the first radio frequency within a predetermined time to continue receiving information and the control signal on the first radio frequency;
- alerting means for alerting a user of the received information; and
- displaying means for displaying the received information.

9. The radio receiver according to claim 8 further comprising a timing means for determining when to return said radio receiver to the first radio frequency.

10. The radio receiver according to claim 8 wherein said programming means programs a frequency synthesizer for receiving information on the first and second radio frequencies.

11. The radio receiver according to claim 8 wherein the controller means returns said radio receiver from the second radio frequency to the first radio frequency following a reception of the information on the second radio frequency.

12. The radio receiver according to claim 8 further comprising a storing means for storing a frequency assignment designating the second frequency of a plurality of cities.

13. A selective call receiver for receiving information on a least two radio frequencies, comprising:
- a receiver for receiving information and a control signal on a first frequency;
- a decoder decodes the received information and a second radio frequency from the control signal being received on the first radio frequency;
- a microcomputer determines when to program said receiver to the second radio frequency responsive to the control signal for temporarily receiving information;
- said microcomputer determines when the receiver has received information on the second radio frequency wherein said microcomputer reprograms said receiver to return from the second radio frequency to the first radio frequency following the receiver receipt of information on the second radio frequency;
- an alerting device for alerting a user of the received information; and
- a displaying device for displaying the received information.

14. A method for communicating on at least two radio frequencies in a radio communication system, comprising the steps of:
   (a) receiving information addressed to at least one of a plurality of radio receivers on a first radio frequency;
   (b) transmitting the information including a control signal to the at least one of the plurality of radio receivers on the first radio frequency;
   (c) determining when to direct the at least one of the plurality of radio receivers to a second radio frequency for receiving information;
   (d) generating the control signal to be transmitted with the information to the at least one of the plurality of radio receivers on the first radio frequency;
   (e) receiving the information and the control signal by said at least one of the plurality of radio receivers on the first frequency;
   (f) decoding the received information and the second radio frequency from the control signal;
   (f1) transmitting information on the second radio frequency;
   (g) temporarily directing said at least one of the plurality of radio receivers to receive information on the second radio frequency; and
   (h) returning said at least one of the plurality of radio receivers from the second radio frequency to the first radio frequency D continue receiving information on the first radio frequency, said step of returning returns said at least one of the plurality of radio receivers to the first radio frequency when said at least one of the plurality of radio receivers has received information on the second radio frequency.

15. In a radio receiver, a method for receiving information on a least two radio frequencies, comprising the steps of:
  (a) receiving information on a first frequency wherein the information includes a control signal for temporarily directing said radio receiver to receive information on a second radio frequency;
  (b) decoding the received information and the second radio frequency from the control signal;
  (c) temporarily directing said radio receiver for receiving information on the second radio frequency;
  (d) receiving information on the second frequency; and
  (e) returning said radio receiver from the second radio frequency to the first radio frequency to continue receiving information, said step of returning returns the radio receiver from the second radio frequency to the first radio frequency when the radio receiver has received information on the second radio frequency.

* * * * *

UNITED STATES PATENT AND TRADEMARK OFFICE
CERTIFICATE OF CORRECTION

PATENT NO.   : 5,491,469
DATED        : February 13, 1996
INVENTOR(S)  : Schwendeman It is certified that error appears in the above-indentified patent and that said Letters Patent is hereby corrected as shown below:

Column 17, Claim 14, Line 1, change "D" to --to--.

Signed and Sealed this

Twenty-fourth Day of December, 1996

Attest:

BRUCE LEHMAN

*Attesting Officer*   *Commissioner of Patents and Trademarks*